S. MARKOWITZ.
DEVICE FOR OPENING EGGS.
APPLICATION FILED NOV. 13, 1915.
1,203,891.
Patented Nov. 7, 1916.
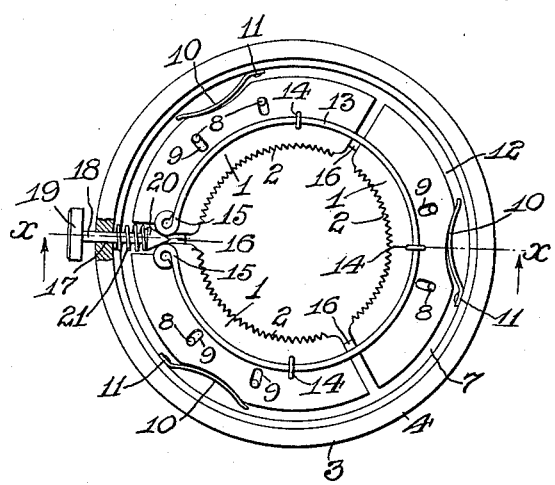

UNITED STATES PATENT OFFICE.

SAMUEL MARKOWITZ, OF NEW YORK, N. Y.

DEVICE FOR OPENING EGGS.

1,203,891.                     Specification of Letters Patent.           Patented Nov. 7, 1916.

Application filed November 13, 1915.   Serial No. 61,213.

*To all whom it may concern:*

Be it known that I, SAMUEL MARKOWITZ, a subject of the Emperor of Austria-Hungary, and resident of the city of New York, in the county of New York and State of New York, have invented a certain new and useful Device for Opening Eggs, of which the following is a specification.

This invention relates to a device for opening eggs, and its principal object is to provide convenient means wherewith a boiled egg may be opened in a manner other than by fracturing the shell thereof, as commonly resorted to heretofore, and wherewith the insanitation and inconveniences incident to opening eggs by fracturing will be prevented.

Other objects and advantages will hereinafter appear.

In the accompanying drawings, Figure 1 is a general plan view of the device, a portion of which is shown removed for convenience of illustration. Fig. 2 is a sectional elevation of the device taken on the line $x$—$x$ of Fig. 1.

Three segmental saws 1 of steel are provided at their inner sides with concave toothed edges 2, whereby together they constitute one circular saw or ring the inner periphery of which serves as the cutting edge. The segments 1 are seated upon a circular ring or frame 3 of suitable material having a tapped rim 4, and a ring 5 threads into said rim and against a ledge 6 of frame 3, leaving a space 7 within which said segments are retained. Pins 8 secured to the frame 3 pass through elongated guiding slots 9 in the segments 1, whereby the segments are capable of being guided and moved in their retaining space 7 toward and away from the center of the device. Leaf-springs 10 secured at one end 11 to the rim 4 of frame 3 bear against the outer edges 12 of the segments 1 and thereby press the segments toward the center of the device, the ends of guiding slots 9 abutting against the pins 8, as shown, and limiting the inward movement of the segments. A flexible circular bar 13, preferably of metal, passes through eyes 14 secured to the segments 1, and its extremities 15 terminate at a meeting place 16 between two of said segments. Through an opening 17 in rim 4 passes a stem 18 provided at its extremity outside of the rim with a thumb-head 19 and at its opposite end with a cone-portion 20 located between the terminals 15 of the bar 13. A spring 21 wound around the stem 18 and secured to the rim 4 and to the cone 20 normally draws the stem outwardly and maintains said cone in the position shown. Upon pressing of the stem 18 by applying the thumb against its head 19 the cone 20 is moved inwardly and caused to bear against the bar-terminals 15 and to spread the circular bar 13 in such manner as to increase its general diameter, whereby the saws or segments 1 are in turn caused by said bar to spread apart from each other and to simultaneously move away from the center of the device with which they are concentric.

The inner and under sides of the ring 3 are beveled and formed, as shown at $21^a$, to follow the configuration of the egg, and by this means the entire device may be conveniently seated upon the wide end 22 of the egg 23, indicated in dash and dot lines, Fig. 2. Preferably a rubber ring $24^a$ is inlaid within the beveled portion $21^a$ to afford firmer seating of said portion against the shell of the egg.

When it is desired to open a boiled egg the device is first seated on the egg in the manner shown, and thereupon the frame 3 may be gripped and rotated partially in opposite directions. This operation causes the toothed edges 2 of saws 1 to produce a complete circular cut around the end of the egg and to thereby sever a circular portion 24 of the shell from the remainder of the egg-shell. The thumb-head 19 may be then pressed to move the toothed cutting edges 2 away from the center of the device and out of the cut in the egg shell, in which manner the saws 1 completely clear the shell so that the device may be thereupon conveniently removed from the egg. After thus producing the cut in the egg shell and removing the device the severed shell-portion 24 may be readily lifted and removed, and the circular opening left in its place may be utilized for inserting a spoon therethrough and removing the egg-contents.

It will be evident that by the utilization of this device boiled eggs may be conveniently and readily opened, by those serving them or by the user at the dining table, and the insanitation resulting frequently from the fingers coming in contact with the egg contents and the many other well known inconveniences incident to opening eggs by means of fracturing the shell and pealing off its pieces will be thereby avoided.

Variations may be resorted to within the scope of the invention, and portions of the improvements may be used without others.

Having thus described my invention, I claim:—

1. A device for opening eggs having the combination of an annular frame, a plurality of saws within said frame adapted to be placed over a portion of the egg, and an individual spring for each of said saws pressing its saw toward the center of said frame.

2. A device for opening eggs having the combination of an annular frame, a plurality of saws within said frame adapted to be placed over a portion of the egg, a spring for each of said saws pressing it toward the center of said frame, and means to move all of said saws apart contrary to the pressure of all of said springs.

3. A device for opening eggs having the combination of an annular frame, a plurality of saws within said frame adapted to be placed over a portion of the egg, means for guiding each of said saws toward and away from the center of said ring, and a spring for each of said saws pressing it toward the center of said frame.

4. A device for opening eggs having the combination of an annular frame, a plurality of saws within said frame adapted to be placed over a portion of the egg, a spring for each of said saws pressing it toward the center of said frame, a flexible bar connecting said saws, and a stem adapted to press against the ends of said bar to move all of said saws simultaneously contrary to the pressure of their springs.

5. A device for opening eggs having the combination of an annular frame, a plurality of saws within said frame adapted to be placed over a portion of the egg, means for guiding said saws toward and away from the center of said frame, a spring for each of said saws pressing it toward the center of said frame, a bar connecting said saws, and a stem adapted to press against the ends of said bar to move all of said saws contrary to the pressure of all of said springs.

6. A device for opening eggs having the combination of an annular frame, a plurality of saws within said frame adapted to be placed over a portion of the egg, means automatically pressing said saws toward the center of said frame, and means to move said saws apart contrary to said pressing means.

7. A device for opening eggs having the combination of an annular frame, a plurality of saws within said frame adapted to be placed over a portion of the egg, a spring for each of said saws pressing it toward the center of said frame, and a spring-pressed stem mounted on said frame adapted to press all of said saws apart contrary to the pressure of all of said springs.

Signed at the city of New York, in the county of New York, and State of New York, this 9th day of November, A. D. 1915.

SAMUEL MARKOWITZ.

Witnesses:
CHAS. W. LA RUE,
H. MILLER.

Copies of this patent may be obtained for five cents each, by addressing the "Commissioner of Patents, Washington, D. C."